(12) United States Patent
Lim et al.

(10) Patent No.: US 6,389,643 B1
(45) Date of Patent: May 21, 2002

(54) MODULAR HINGE

(75) Inventors: Felicity Sy Hing Lim; Long Chew Theng, both of Singapore (SG)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/483,058

(22) Filed: Jan. 14, 2000

(30) Foreign Application Priority Data

Jul. 26, 1999 (SG) ............................................. 9903602

(51) Int. Cl.[7] ................................................. E05D 7/12
(52) U.S. Cl. ..................... 16/271; 16/DIG. 43; 16/260; 16/342
(58) Field of Search ................... 16/271, 342, DIG. 43, 16/268, 265, 261, 262, 260; 361/681, 683

(56) References Cited

U.S. PATENT DOCUMENTS

| | | | | |
|---|---|---|---|---|
| 776,153 A | * | 11/1904 | Swacick | ...................... 16/262 |
| 5,566,048 A | * | 10/1996 | Esterberg et al. | ........... 361/681 |
| 5,636,102 A | * | 6/1997 | Fujino et al. | ............... 361/681 |
| 5,724,704 A | * | 3/1998 | Seo | .............................. 16/271 |
| 6,064,565 A | * | 5/2000 | Ishihara et al. | ............. 361/681 |
| 6,170,120 B1 | * | 1/2001 | Lu | ............................... 16/342 |

* cited by examiner

*Primary Examiner*—Lynne H. Browne
*Assistant Examiner*—Aaron Dunwoody
(74) *Attorney, Agent, or Firm*—Conley, Rose & Tayon, P.C.

(57) ABSTRACT

A modular hinge includes a clutch module coupled to an extension arm for supporting an enclosure, such as a display enclosure for a portable computer. The clutch module and extension arm are fabricated as separate parts, and then assembled together to form essentially one permanent hinge. This arrangement allows the extension arm of the hinge to by-pass the prehardening heat treatment, which is required for the clutch module.

32 Claims, 4 Drawing Sheets

MODULAR HINGE

FIELD OF THE INVENTION

The present invention relates to hinges for mechanically supporting two objects in a rotational orientation. In particular, the present invention relates to a modular hinge arrangement that structurally supports portable computer displays.

BACKGROUND OF THE INVENTION

Monitors or displays for portable computers are usually mounted in display enclosures, which are in turn mounted to the base of the computer with hinges. The display enclosures are usually constructed of a lightweight material such as molded plastic, which is capable of adequately supporting and protecting the monitor despite being subject to rough handling. The hinges are typically attached by screws or other fasteners directly to the plastic display enclosure.

Consumers typically want the largest possible display that they can afford in a computer system. This is as true with portable computers as it is with desktop computers. As portable computer displays become larger, the weight of the larger display causes additional stress on the hinges and the places where the hinge attaches to the computer base and display enclosure, often resulting in cracks. To solve this problem, manufacturers have increased the surface area of the hinge with an extension arm to alleviate the localization of stress. The difficulty, however, is that the manufacturing yield for such a hinge is low due to the tendency of the arm to distort during the normal prehardening process, which involves heat treatment.

In addition, because of the desirability of larger monitors, manufacturers often upgrade existing portable computer product lines by increasing the monitor size. The problem with this type upgrading is that it requires the computer base and hinge arrangement to be re-designed in the upgraded model to support the larger monitor. Once the base and hinge designs are modified, then new tooling must be performed before manufacturing can begin. It would be desirable if a modular hinge design could be developed that would permit monitors of various sizes to couple to the portable computer base, without requiring the base or hinge to be re-designed and re-tooled.

SUMMARY OF THE INVENTION

The present invention, constructed in accordance with the preferred embodiment, includes a hinge arrangement that attaches a portable computer base to display units of various sizes and weights. The hinge arrangement preferably employs a modular design that permits various size displays to be easily and securely attached to the base, while also reducing stress in the immediate vicinity of the hinge. The hinge arrangement described in the preferred embodiment includes two modules that are relatively easy to assemble, and relatively low-cost.

In accordance with the preferred embodiment, a modular hinge includes a clutch module and a stress dispersing module which are fabricated as separate parts, and then assembled together to form essentially one permanent hinge. Relative movement (both laterally and vertically) between the clutch module and the stress dispersing module are prevented by the rigid association between the two parts. In the preferred embodiment, the stress dispersing module includes an extension arm. The modularity of the hinge allows the extension arm to by-pass the prehardening heat treatment process, thus increasing the manufacturing yield for this component. The extension arm attaches to the display enclosure. As the size and weight of the monitor and display enclosure changes, the length of the extension arm can be modified if necessary to provide the necessary support for the new monitor size.

DESCRIPTION OF THE PREFERRED EMBODIMENT

Figure 1:
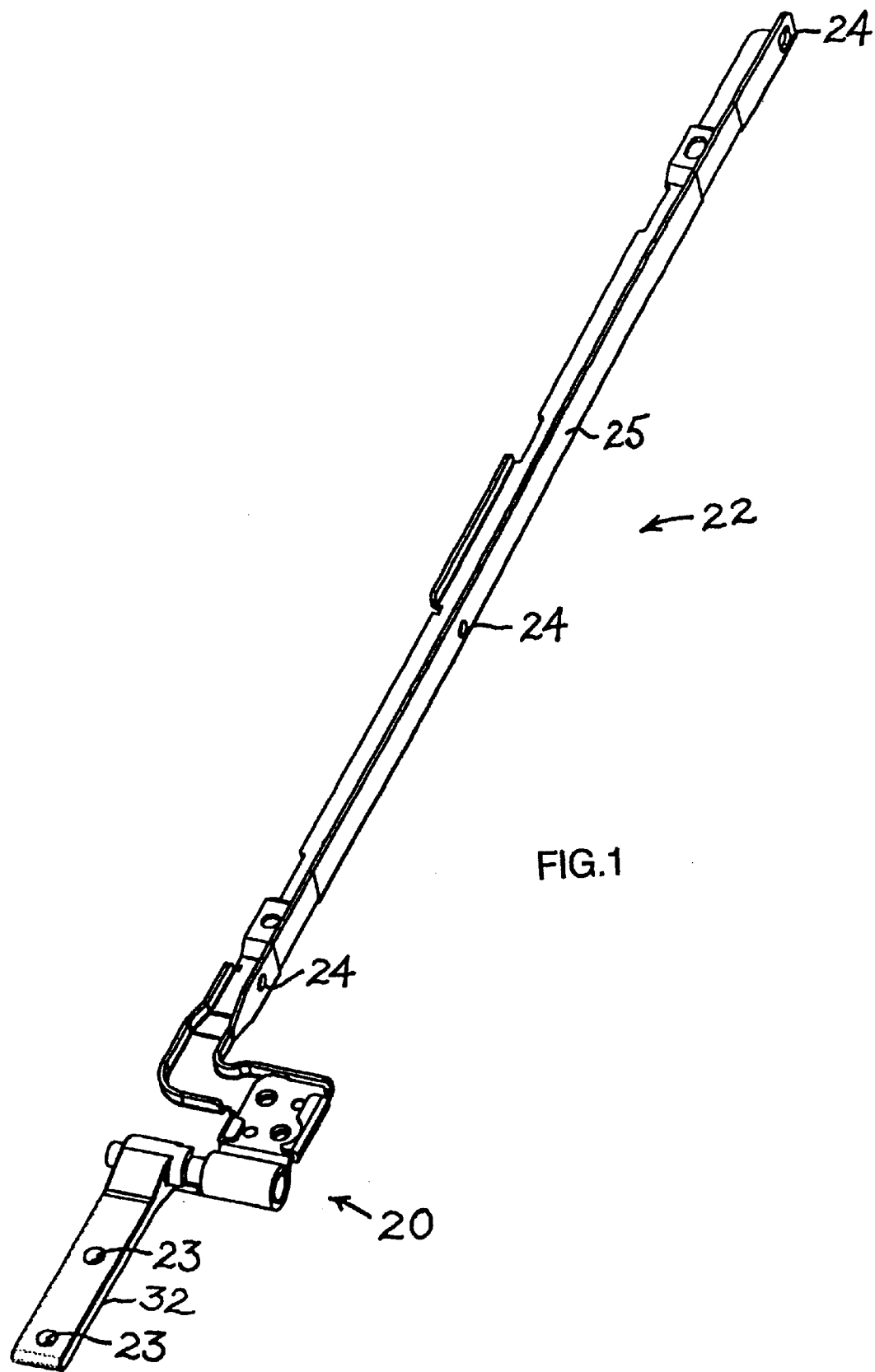
FIG. 1 is an elevated perspective view of the hinge and extension arm constructed in accordance with the preferred embodiment of the present invention.

Referring initially to FIG. 1, a modular hinge constructed in accordance with the preferred embodiment generally comprises a clutch module 20 and a stress dispersing module 22, including an extension arm 25. If the modular hinge is used for attachment of a display unit onto the base of a portable computer, the clutch has one end adapted for attachment to the computer base with screws through attachment holes 23. Arm 25 is adapted for attachment to the display enclosure with screws (not shown) through side holes 24. In this way, the stress of supporting the weight of the display is dispersed to the various attachment points along the length of the arm 25.

Figure 2:
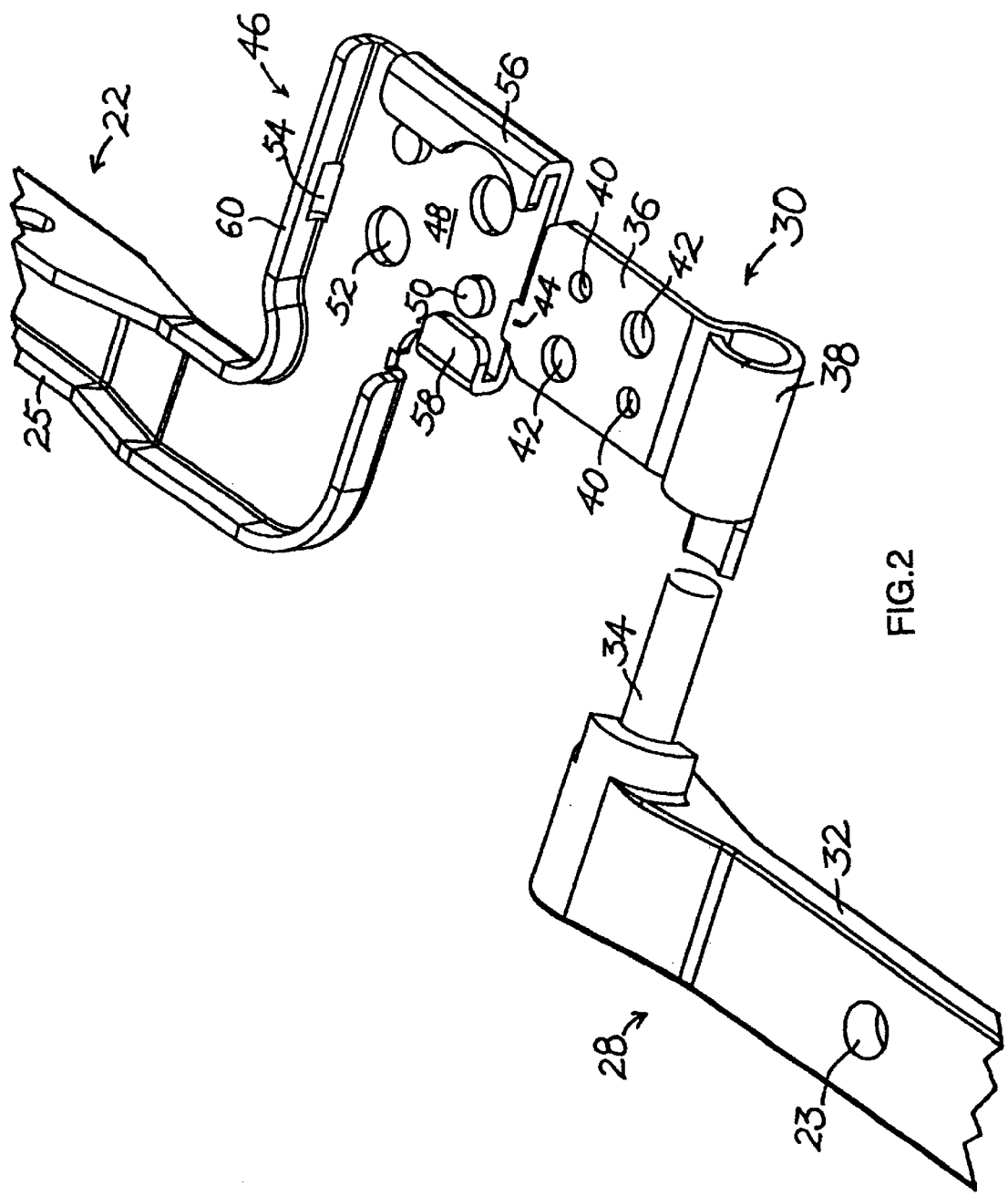
FIG. 2 is an exploded view of the hinge and extension arm of FIG. 1.
Figure 3:
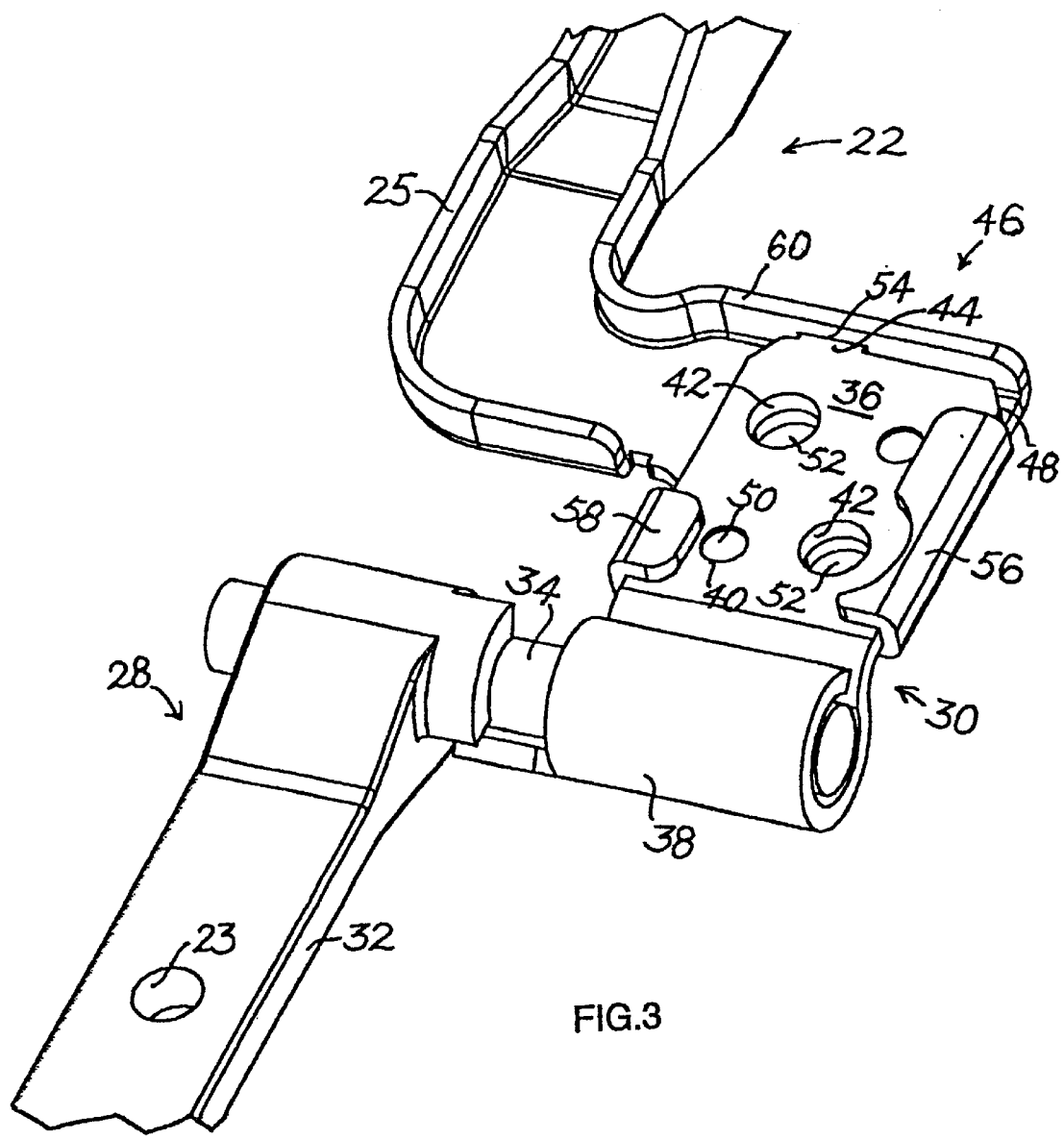
FIG. 3 is an enlarged elevated view showing the insertion of the hinge in the extension arm of FIG. 2.

FIGS. 2 and 3 show in greater detail the manner in which the clutch module 20 and the stress dispersing module 22 are secured together in the preferred embodiment of the present invention. The clutch module 20 preferably is fabricated in two parts, which comprise an adapter 28 and a mounting member 30. In the preferred embodiment, both parts are pre-hardened by heat treatment before assembly.

As shown in the preferred embodiment of FIGS. 2 and 3, the adapter 28 has a flat, rectangular end portion 32 with two screw holes 23 for fastening to the side of the base of the computer. The adapter 28 also preferably includes a shaft 34 extending from the base of the adapter 28. The longitudinal axis of shaft 34 preferably is perpendicular to the of the rectangular end portion 28 and defines the axis of rotation of the attached display enclosure.

The mounting member 30 preferably includes a mounting plate 36 and a bracket 38. Bracket 38 is adapted to receive shaft 34 such that mounting plate 36 may rotate around the longitudinal axis of shaft 34. In the preferred embodiment, the mounting plate 36 includes two through holes 40 and two mounting holes 42. The mounting holes 42 preferably receive screws or other fasteners (not shown) for mounting the hinge on the display enclosure. The end of the mounting plate 36 distal the bracket 38 is also provided with a lug 44.

As best seen in FIG. 2, the long extension arm 25 of the stress dispersing module 22 preferably includes a bracing end 46, which has a planar surface 48 for interaction with the mounting plate 36. The planar surface 48 is stamped with two dimples 50, two holes 52 and a slot 54 which is adapted to receive lug 44 fittingly. As shown in FIG. 3, the mounting plate 36 is adapted to be superimposed above planar surface 48 with holes 42 superimposed upon holes 52, and the back of the two dimples 50 inserted into through holes 40. The bracing end 46 includes a flange 60 with slot 54. The flange 60 defines a shoulder for receiving the distal end of the mounting plate 36, with slot 54 positioned perpendicular to the plane of the planar surface 48, so that lug 44 may be locked inside slot 54. The lateral sides 56 and 58 of the planar surface 48 preferably are folded up and around the mounting plate 36 such that they act as clamps to keep the two hinge modules securely together.

After the adapter 28 and the mounting member 30 are pre-hardened, the hinge is assembled by inserting the shaft 34 into bracket 38 and superimposing mounting plate 36 onto the planar surface 48 of the bracing end 46 such that the back of dimples 50 are inserted into through holes 40, thus preventing lateral movement between the two modules. The flange 60 of the planar surface 48 is then folded up to form a perpendicular shoulder, with slot 54 locking onto lug 44, to prevent the rotational force of the hinge from forcing the two modules apart. The two lateral sides 56 and 58 of the planar surface 48 are also wrapped around the mounting plate 36 to prevent the dimples 50 from slipping out of through holes 40.

Figure 4:
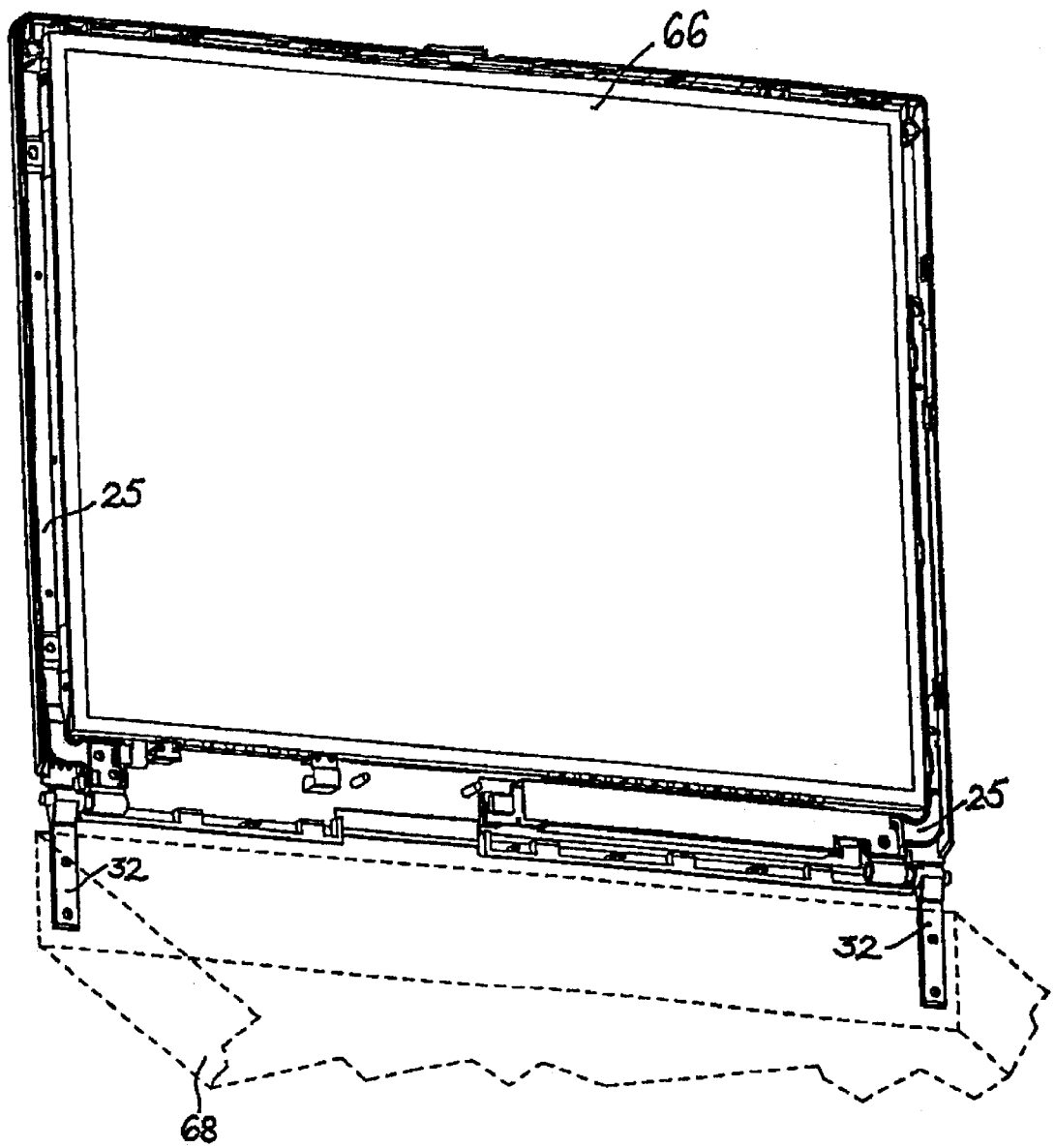
FIG. 4 is a perspective view of the hinge attached to a display panel and base of a computer according to the present invention.

Referring lastly to the embodiment as shown in FIG. 4, the present invention is applied to a portable computer whereby the extension arm 25 of the present hinge is fastened onto display panel 66, while the rectangular end portion of the adapter 32 is attached to the base 68 of the portable computer.

From the description above, it is clear that there are numerous benefits to the modular approach to hinge joints. When the size of the display unit changes, time and costs for tooling new parts may be reduced since the same clutch module 20 may be used, and only the stress dispersing module 22 needs to be changed. Furthermore, since pre-hardening is not required for the stress dispersal module 22, structural distortion due to the heat treatment process is eliminated, and production efficiency is increased. It is also clear that although the present invention has been described particularly with references to the aforementioned figures with emphasis on a hinge for the display enclosure of a portable computer, the method and apparatus of the present invention has utility in many applications where hinged connections are required. Example include but not are not limited to photocopying machines, electronic organizers and mobile electronic equipment, among others.

What is claimed is:

1. A modular hinge that couples an enclosure to a base, comprising:
    a clutch module that includes an end portion that attaches to the base, and a mounting plate that rotatably couples to the end portion;
    a stress dispersing module that includes an extension arm at the upper end of the stress dispersing module that attaches to said enclosure, and a generally planar surface at the lower end of the stress dispersing module that fixedly attaches to said mounting plate.

2. A modular hinge as in claim 1, wherein the clutch module further includes a shaft extending from the end portion, said shaft having a longitudinal axis that defines an axis of rotation of said enclosure.

3. A modular hinge as in claim 2, further comprising a bracket that receives said shaft, said bracket being affixed to said mounting plate to permit the mounting plate to rotate around the longitudinal axis of said shaft.

4. A modular hinge as in claim 3, wherein said mounting plate includes a lug on a distal end of said mounting plate.

5. A modular hinge as in claim 4, wherein the generally planar surface includes at least one dimple, and said mounting plate includes an aperture for receiving said dimple.

6. A modular hinge as in claim 5, wherein the generally planar surface includes at least one side clamp that wraps around said mounting plate.

7. A modular hinge as in claim 4, wherein the generally planar surface includes a flange extending generally perpendicularly from said planar surface to form a shoulder for the distal end of said mounting plate.

8. A modular hinge as in claim 7, wherein the flange includes a slot that receives the lug on said mounting plate.

9. A modular hinge as in claim 8, wherein said mounting plate and said planar surface include alignment holes through which a fastener extends for attaching to said enclosure.

10. A modular hinge that couples an enclosure to a base, comprising:
    a clutch module that includes an end portion that attaches to the base, and a mounting plate that rotatably couples to the end portion;
    a stress dispersing module that includes an elongated extension arm at the upper end of the stress dispersing module that attaches to said enclosure, and a generally planar surface at the lower end of the stress dispersing module that fixedly attaches to said mounting plate, wherein said enclosure comprises a display enclosure in which a display unit mounts, and said base comprises a portable computer base.

11. A hinge for rotatably coupling a first object to a second object, comprising:
    a clutch module including:
        an adapter with a shaft extending from the adapter) said adapter capable of attaching to said first object; and
        a mounting plate rotatably coupled to said shaft;
    an elongated stress dispersing module attached to said second object including:
        a first end fixedly clamped to said mounting plate; and
        a second end adapted for attachment to said second object.

12. A hinge according to claim 11 wherein
    said mounting plate includes a throughhole;
    said first end of said stress dispersing module comprises a planar surface, with said planar surface having at least one dimple; and
    wherein said mounting plate is superimposed on said planar surface with the dimple on said planar surface inserted into said throughhole on said mounting plate.

13. A hinge according to claim 12, wherein the sides of said planar surface are folded rigidly around said mounting plate to prevent lateral and vertical movement of the mounting plate with respect to the planar surface.

14. A hinge according to claim 13, wherein said mounting plate further includes a bracket at a first end thereof for receiving said shaft, and said mounting plate further includes a lug extending from the end of said mounting plate distal from said bracket end.

15. A hinge as in claim 14, wherein said planar surface includes a flange extending perpendicularly from the planar surface; and the flange includes a slot into which said lug is inserted such that rotational movement of said planar surface is directly translated to said mounting plate.

16. A modular hinge coupling a portable computer base to a display enclosure, comprising:
    a clutch module including:
        a rigid adapter with a first end fastened to said base and a second end containing a shaft having a longitudinal axis defining an axis of rotation of said display enclosure; and a rigid mounting member with a mounting plate and a bracket end, said bracket end rotatably coupled to said shaft to enable said mounting plate to rotate about said shaft, a rigid stress dispersing module including:

an extension arm mounted to said display enclosure; and a bracing end connected to said extension arm and fixedly clamped onto said mounting plate;

whereby said display enclosure may be rotated along said axis of rotation with said extension arm bearing the stress from the weight of said display enclosure.

17. A hinge according to claim 16, wherein said mounting plate further comprises at least one hole; and said bracing end contains a planar surface superimposed with said mounting plate, said planar surface containing at least one dimple, with the back of said dimple inserted through said hole.

18. A hinge according to claim 17, wherein the sides of said planar surface are folded rigidly around said mounting plate to prevent relative lateral and vertical movements between the mounting plate and the planar surface.

19. A hinge according to claim 16, wherein said mounting plate further contains a lug extending from the end distal from said bracket end; and said bracing member includes a flange with a slot therethrough into which said lug is inserted.

20. A portable computer, comprising:

a keyboard;

a base into which said keyboard is mounted;

a display;

a display enclosure into which said display is mounted; and a modular hinge arrangement that couples said base to said display enclosure, including:

a clutch module that includes an end portion that attaches to the base, and a mounting plate that rotatably couples to the end portion; and a stress dispersing module that includes an extension arm at the upper end of the stress dispersing module that attaches to said display enclosure, and a generally planar surface at the lower end of the stress dispersing module that fixedly attaches to said mounting plate.

21. A portable computer as in claim 20, wherein the clutch module further includes a shaft extending from the end portion, said shaft having a longitudinal axis that defines an axis of rotation of said display enclosure.

22. A portable computer as in claim 21, further comprising a bracket that receives said shaft, said bracket being affixed to said mounting plate to permit the mounting plate to rotate around the longitudinal axis of said shaft.

23. A modular hinge as in claim 22, wherein said mounting plate includes a lug on a distal end of said mounting plate.

24. A modular hinge as in claim 23, wherein the generally planar surface includes at least one dimple, and said mounting plate includes an aperture for receiving said dimple.

25. A modular hinge as in claim 24, wherein the generally planar surface includes at least one side clamp that wraps around said mounting plate.

26. A modular hinge as in claim 25, wherein the generally planar surface includes a flange extending generally perpendicularly from said planar surface to form a shoulder for the distal end of said mounting plate.

27. A modular hinge as in claim 26, wherein the flange includes a slot that receives the lug on said mounting plate.

28. A modular hinge as in claim 27, wherein said mounting plate and said planar surface include alignment holes through which a fastener extends for attaching to said display enclosure.

29. A modular hinge as in claim 1, wherein the extension arm is elongated.

30. A modular hinge as in claim 10, wherein the extension arm is elongated.

31. A hinge as in claim 11, wherein the second end is elongated.

32. A modular hinge as in claim 16, wherein the extension arm is elongated.

* * * * *